United States Patent [19]
Jain

[11] Patent Number: 5,181,942
[45] Date of Patent: Jan. 26, 1993

[54] CONTINUOUS METHOD FOR REMOVING OIL VAPOR FROM FEED GASES CONTAINING WATER VAPOR

[75] Inventor: Ravi Jain, Piscataway, N.J.
[73] Assignee: The BOC Group, Inc., New Providence, N.J.
[21] Appl. No.: 626,797
[22] Filed: Dec. 13, 1990
[51] Int. Cl.$^5$ ............................................. B01D 53/04
[52] U.S. Cl. ........................................... 55/31; 55/33; 55/74; 55/75; 55/179; 55/208; 55/387; 55/389
[58] Field of Search ................... 55/31, 33, 35, 68, 74, 55/75, 179, 208, 387, 389

[56] References Cited

U.S. PATENT DOCUMENTS

| | | | |
|---|---|---|---|
| 3,193,985 | 7/1965 | Suggelin | 55/33 |
| 3,231,512 | 1/1966 | Harter | 55/33 X |
| 3,487,608 | 1/1970 | Gräff | 55/33 |
| 3,555,787 | 1/1971 | Lustig | 55/387 X |
| 3,557,534 | 1/1971 | Kennedy | 55/35 X |
| 3,981,698 | 9/1976 | Leppard | 55/31 |
| 4,054,428 | 10/1977 | Foltz | 55/33 |
| 4,230,463 | 10/1980 | Henis et al. | 55/16 |
| 4,645,516 | 2/1987 | Doshi | 55/16 |
| 4,781,907 | 11/1988 | McNeill | 55/16 X |
| 4,783,201 | 11/1988 | Rice et al. | 55/16 |
| 4,790,860 | 12/1988 | Sexton | 55/208 X |
| 4,859,215 | 8/1989 | Langsam et al. | 55/16 |
| 4,881,953 | 11/1989 | Prasad et al. | 55/16 |

FOREIGN PATENT DOCUMENTS

| | | | |
|---|---|---|---|
| 1619855 | 8/1970 | Fed. Rep. of Germany | 55/208 |
| 55-110844 | 8/1980 | Japan | 55/208 |

Primary Examiner—Robert Spitzer

[57] ABSTRACT

A method for removing oil vapor from a feed gas containing water vapor which comprises the steps of passing the feed gas through a first adsorption layer to remove the water vapor from the feed gas and to produce a dry feed gas having water vapor below a predetermined level, passing the dry feed gas through a second adsorption layer to remove oil vapor from the feed gas and to produce a purified, dry, oil-free gas, and passing the dry, oil-free gas through a third adsorption layer to desorb water form the third adsorption layer and thereby regenerate the third adsorption layer.

23 Claims, 3 Drawing Sheets

CONTINUOUS METHOD FOR REMOVING OIL VAPOR FROM FEED GASES CONTAINING WATER VAPOR

BACKGROUND OF THE INVENTION

1. Field of the Invention

The present invention is directed to a continuous method for removing oil vapor from a feed gas containing water vapor. More particularly, the present invention is directed to an improved adsorption method for the continuous removal of oil vapor from gas containing water vapor which comprises sequentially passing the feed gas through a first adsorption layer comprising a regenerable desiccant, a second adsorption layer comprising an oil adsorbent, and a third adsorption layer comprising a regenerable desiccant, and reversing the flow direction after a certain amount of time.

2. Description of the Prior Art

The removal of oil vapor from gaseous streams is essential for the preparation of many gaseous products. Examples of such oil-free gas products include oil-free air for breathing purposes, oil-free feed mixtures to prevent degradation of downstream processes such as permeable membrane separations, and oil-free gases to prevent oil vapor contamination of high purity products produced in other downstream processes.

Permeable membrane separation is a well known method for separating gaseous mixtures. Permeable membrane separation involves passing a gaseous feed mixture at an elevated pressure through a permeable membrane system to recover the more readily permeable component of the feed mixture as the permeate at low pressure and to recover the less readily permeable component of the feed stream as the residue stream at essentially the feed pressure. The term "gaseous mixture", as used herein, refers to a gaseous mixture, such as air, primarily comprised of two components having different permeabilities through the membrane material.

A major application of permeable membrane separations is in the field of air separation. Polymeric membranes are generally employed for this application. In most cases, oxygen is the more permeable component and becomes the enriched component in the permeate stream while nitrogen is the less permeable component and becomes the enriched component in the residue stream.

The permeable membrane separation systems must exhibit reasonable stability and must not suffer undue degradation during the separation method. In order to minimize cost, oil-flooded screw compressors are typically utilized to supply pressurized feed gas to the surface of a membrane separation system. Such oil-flooded compressors are also employed in other types of feed gas applications and other types of oil lubricated compressors are employed to compress feed gas to membrane separation systems. In such applications, the compressor generally contaminates the feed gas with oil which degrades the performance of the membrane system or otherwise has a detrimental effect upon the feed gas application. The presence of even relatively low concentrations of heavy hydrocarbon oil vapors, e.g., less than about 1 ppm by volume, can result in rapid and extensive loss of membrane permeability. Contaminants commonly present in ambient air, such as light hydrocarbons, water, and carbon dioxide, generally result in only a modest or no decrease in membrane permeability.

Because of the potential loss of membrane performance, membranes are generally sized with a safety factor sufficiently large to compensate for the anticipated permeability loss from all sources. However, neither over-design of the membrane system nor interruption of the gas product operation to renew the membrane is a satisfactory means for overcoming membrane permeability degradation.

One approach to preserve the permeability of a membrane is to provide a purification vessel containing an adsorption layer or trap to remove oil contaminants. The bed size of the oil adsorption layer is determined by the anticipated hydrocarbon loading of the adsorption layer and the contamination level of the feed gas stream being treated. If the quantity of oil adsorption layer is excessive, the adsorption vessel cost and the feed gas pressure drop across the vessel will be unnecessarily high resulting in higher power consumption costs. If the quantity of adsorption layer material is not sufficient, premature breakthrough of hydrocarbon vapors from the adsorption layer will take place and loss of membrane performance will occur.

Membrane separation systems are more fully described in "Membranes in Separations" by Hwang and Kammermeyer, Chapter XIII, Wiley (1975), U.S. Pat. No. 4,230,463, issued to Henis et al., and in U.S. Pat. No. 4,772,392, issued to Sanders, Jr. et al., which references are incorporated herein by reference.

A problem with using oil adsorption layers, such as activated carbon, to remove oil vapors from a feed gas is that such adsorbents also adsorb substantial amounts of water, especially at high relative humidity. When such oil adsorbents become saturated with water, the adsorbent is able to adsorb less oil requiring frequent changing of the oil adsorption layer.

One method for removing water vapor from a feed gas, prior to contacting the feed gas with an oil adsorption layer, involves contacting the gas with a hygroscopic agent, such as silica gel, molecular sieves, quick lime, calcium chloride, phosphorous pentoxide, lithium chloride, or concentrated sulfuric acid. This method has the advantage of being able to reduce the water vapor concentration in the feed gas to low levels but has the disadvantage of requiring an interruption in the purification process to dispose of, or regenerate, the used hygroscopic agent.

Another method for removing water vapor from a feed gas involves condensing the water vapor in the gas by compressing the gas and cooling the gas to below ambient temperature in a refrigerated cooler and then reheating the gas to above room temperature. This method has the advantage of being able to continuously remove water vapor in large scale but has the disadvantage of not being able to reduce the water vapor concentration to low levels and requiring a large quantity of energy and high maintenance.

Calculated and experimental adsorption equilibria values have been compared for adsorption of mixtures of water vapor and solvent on activated carbon adsorption layers, by Ozaki et al., *J. Chem. Eng. Japan*, Vol. 11, pp. 209-211 (1978). Ozaki et al. show in FIGS. 2 and 3 that at low relative humidity (below about 30%) activated carbon adsorbs little moisture while at high relative humidity, activated carbon adsorbs substantial amounts of moisture. At low relative humidity, adsorption of water occurs primarily by weak interactions between the water molecules and the activated carbon. At high relative humidity, hydrogen bonding causes the water molecules to cluster in the pores of the activated carbon causing the adsorbent to adsorb substantial amounts of moisture, up to 40% by weight. This adsorption of substantial amounts of moisture can be expected to reduce the oil-vapor adsorption capacity of the adsorbent substantially. The detrimental effect of oil vapor on permeable membrane performance is well known.

U.S. Pat. No. 4,783,201, issued to Rice et al., discloses a gas dehydration process which comprises contacting a feed gas containing water vapor with one side of an uncoated, asymmetric membrane having controlled porosity, permeating a majority of the water vapor in the feed gas through the membrane, and removing the resulting nonpermeate dehydrated gas from the membrane. Rice et al. show in Example 5 that membrane permeability, P/l in Table 1, drops by more than 50% when oil vapor is applied continuously to the membrane. This loss of permeability is irreversible.

Romano et al., "Proceedings of the Seventh Annual Membrane Technology/Planning Conference", pp. 168-169, Cambridge, Mass. (1989), describe the effect of oil vapors on the performance of permeable membranes. Romano et al. state that as much as a 25% decline in oxygen permeability of the permeable membrane with time occurs during ambient temperature operation.

U.S. Pat. No. 4,859,215, to Langsam et al., discloses a polymeric membrane for gas separation which comprises a silyl substituted polyacetylene polymer to which has been added an additive to increase the gas selectivity of the membrane. Langsam et al. state that the oxygen permeability of PTMSP (poly-trimethylsilyl 1-propyne) membranes decreases with exposure to oil vapors.

U.S. Pat. No. 3,672,824, to Tamura et al., discloses a method for removing carbon monoxide from moisture containing air which comprises oxidizing the carbon monoxide with a catalyst disposed between two dehydration chambers packed with a desiccant. The desiccant is capable of allowing adsorbed moisture to be desorbed. The method comprises passing the moist air containing carbon monoxide sequentially through the three adjacent chambers first in one direction until the first dehydration chamber becomes saturated with water then passing the air in the other direction for a similar length of time continuously and sequentially.

U.S. Pat. No. 4,881,953, to Prasad et al., discloses a process for purifying a gaseous mixture prior to separation of the mixture by passing the gaseous mixture through a bed of adsorbent material to adsorb the heavier hydrocarbon contaminants (greater than $C_5$) responsible for degradation of the membrane without removing the lighter hydrocarbons. The compressed air is sent to an aftercooler, a moisture separator, and is then heated to prevent condensation in the adsorbent bed and in the membrane separation unit. The relative humidity of the feed gas entering the carbon bed is about 85%.

While the above methods for purifying a feed gas in a permeable membrane separation system provide improvements in the performance of such permeable membrane separation systems, none of these methods are entirely satisfactory. Common problems with conventional purification methods include high adsorption of water vapor and low adsorption of oil vapor in the oil adsorbent, frequent renewal of the oil adsorption layer and the permeable membrane system, the need to heat the gas entering the carbon bed to prevent condensation, and low adsorption of lower hydrocarbons ($C_5$ and lower) in the oil adsorption layer resulting in contamination of the purified gas product. While the adsorption of large amounts of water vapor by oil vapor adsorbents is known, such water vapor adsorption reduces the oil vapor adsorption capacity of the oil vapor adsorbent. None of the above methods solves the problem of protecting the oil adsorption layer from moisture in an efficient manner and for extended periods of time. Hence there is a need for an improved method for continuously purifying a feed gas in a membrane separation system which can be employed economically. The present invention provides such an improved method for continuously and economically removing oil vapor from a feed gas containing water vapor in a membrane separation system.

SUMMARY OF THE INVENTION

The present invention is directed at an adsorption method for removing oil vapor from a feed gas containing water vapor which comprises the steps of (A) providing a purification vessel having an inlet end and an outlet end and containing three adjacent adsorption layers which comprise (a) a first adsorption layer comprising a regenerable desiccant, (b) a second adsorption layer comprising an oil adsorbent, (c) a third adsorption layer comprising a regenerable desiccant, wherein the first adsorption layer is adjacent to the inlet end of the purification vessel and the third adsorption layer is adjacent to the outlet end of the purification vessel, (B) passing the feed gas into the inlet end of the purification vessel and into the first adsorption layer to remove water vapor from the feed gas and to produce a dry feed gas having water vapor below a predetermined level, (C) withdrawing the dry feed gas from the first adsorption layer and passing the dry feed gas into the second adsorption layer to remove oil vapor from the feed gas and to produce a purified, dry, oil-free gas, (D) withdrawing the dry, oil-free gas from the second adsorption layer and passing the dry, oil-free gas into the third adsorption layer to desorb water from the third adsorption layer and thereby regenerate the third adsorption layer, (E) withdrawing the purified oil-free gas from the third adsorption layer and the outlet end of the purification vessel and passing the purified gas to a downstream system, (F) after a preset period of time, reversing the flow of feed gas in the purification vessel by passing the feed gas into the outlet end of the purification vessel and into the regenerated third adsorption layer to remove water vapor, into the second adsorption layer to remove oil vapor, and into the first adsorption layer to desorb water from the first adsorption layer to thereby regenerate the first adsorption layer, and withdrawing the purified oil-free gas from the first adsorption layer and the inlet end of the purification vessel and passing the purified gas to the downstream system, and (G) repeating the above steps in a continuous cyclical process.

The present invention is also directed at an adsorption apparatus for removing oil vapor from a feed gas containing water vapor which comprises (A) a purification vessel having an inlet end and an outlet end and containing three adjacent adsorption layers which comprise (a) a first adsorption layer comprising a regenerable desiccant, (b) a second adsorption layer comprising an oil adsorbent, (c) a third adsorption layer comprising a regenerable desiccant, wherein the first adsorption layer is adjacent to the inlet end of the purification vessel and the third adsorption layer is adjacent to the outlet end of the purification vessel, (B) a source of a feed gas containing oil vapor and water vapor connected to the inlet end of the purification vessel by a conduit containing a switching valve and to the outlet end of the purification vessel by a conduit containing a switching valve, and (C) a downstream system, for receiving oil-free feed gas, connected to the outlet end of the purification vessel by a conduit containing a switching valve and to the inlet end of the purification vessel by a conduit containing a switching valve.

DETAILED DESCRIPTION OF THE INVENTION

Figure 1:
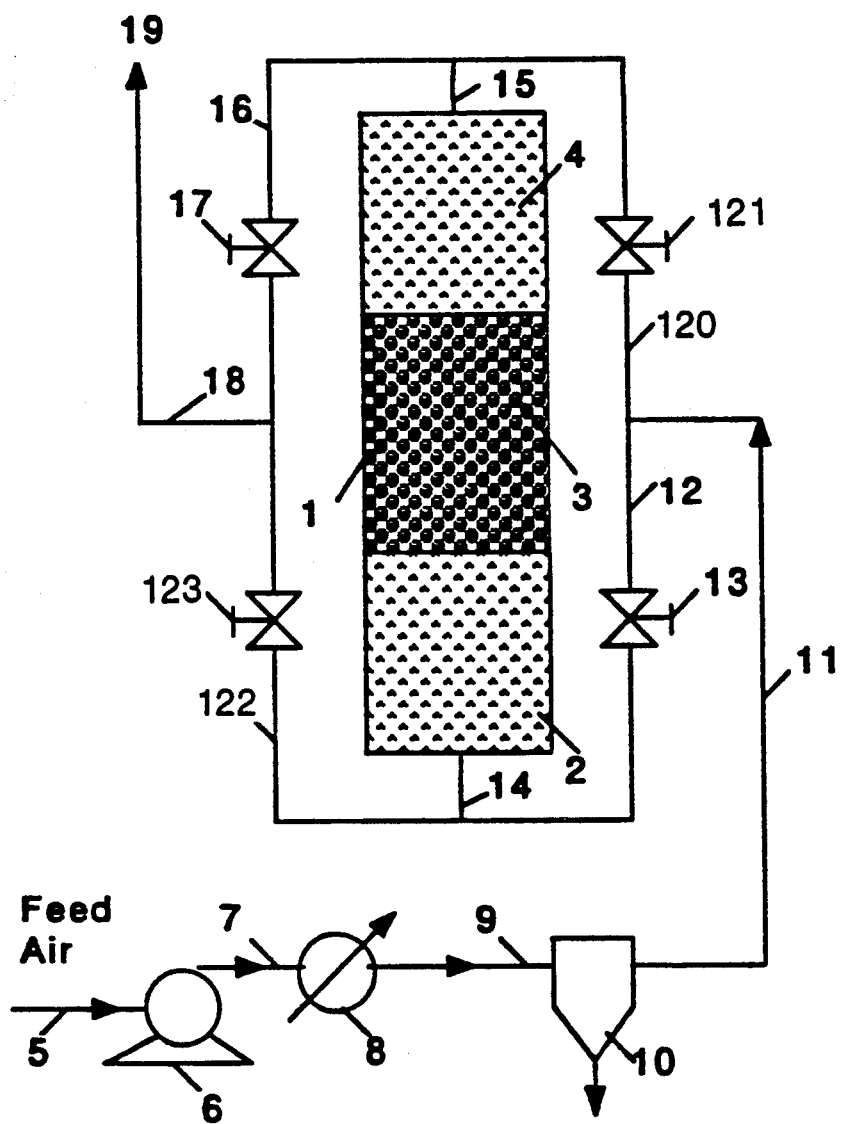
FIG. 1 is a schematic drawing of a single purification vessel apparatus containing three adjacent adsorption layers suitable for removing oil vapor from a feed gas containing water vapor according to the method of the present invention.

Applicant has found that the combination of three adjacent adsorption layers which comprise a first adsorption layer comprising a regenerable desiccant, a second adsorption layer comprising an oil adsorbent, and a third adsorption layer comprising a regenerable desiccant, provides an improved purification vessel for the continuous purification of a feed gas in a membrane separation system. While not wishing to be bound by theory, applicants believe that the combination of the three adjacent adsorption layers efficiently purifies the feed gas because water vapor is removed in the first adsorption layer prior to the removal of oil vapor in the second adsorption layer. Protecting the oil adsorption layer from water enables the oil adsorption layer to remove more oil over an extended period of time. Passing the purified, dry, oil-free gas into the third adsorption layer to desorb water from the third adsorption layer and thereby regenerate the third adsorption layer permits the purification process to be carried out continuously and efficiently. Except for the pressure drop in the purification vessel, the method of the present invention consumes no power because the entire quantity of feed gas is recovered as purified gas.

In accord with the present invention, the adsorption method for removing oil vapor from a feed gas containing water vapor comprises the steps of (A) providing a purification vessel having an inlet end and an outlet end and containing three adjacent adsorption layers which comprise (a) a first adsorption layer comprising a regenerable desiccant, (b) a second adsorption layer comprising an oil adsorbent, (c) a third adsorption layer comprising a regenerable desiccant, wherein the first adsorption layer is adjacent to the inlet end of the purification vessel and the third adsorption layer is adjacent to the outlet end of the purification vessel, (B) passing the feed gas into the inlet end of the purification vessel and into the first adsorption layer to remove water vapor from the feed gas and to produce a dry feed gas having water vapor below a predetermined level, (C) withdrawing the dry feed gas from the first adsorption layer and passing the dry feed gas into the second adsorption layer to remove oil vapor from the feed gas and to produce a purified, dry, oil-free gas, (D) withdrawing the dry, oil-free gas from the second adsorption layer and passing the dry, oil-free gas into the third adsorption layer to desorb water from the third adsorption layer and thereby regenerate the third adsorption layer, (E) withdrawing the purified oil-free gas from the third adsorption layer and the outlet end of the purification vessel and passing the purified gas to a downstream system, (F) after a preset period of time, reversing the flow of feed gas in the purification vessel by passing the feed gas into the outlet end of the purification vessel and into the regenerated third adsorption layer to remove water vapor, into the second adsorption layer to remove oil vapor, and into the first adsorption layer to desorb water from the first adsorption layer to thereby regenerate the first adsorption layer, and withdrawing the purified oil-free gas from the first adsorption layer and the inlet end of the purification vessel and passing the purified gas to the downstream system, and (G) repeating the above steps in a continuous cyclical process.

The gaseous feed mixtures which may be purified and separated from oil vapor according to the method of the present invention include, but are not limited to, air (nitrogen and oxygen), methane and carbon dioxide, hydrogen and carbon monoxide, hydrogen and an off-gas such as methane, ethane, and other hydrocarbons, and hydrogen and ammonia purge gas. The preferred gaseous feed mixture is air.

The regenerable desiccants useful in the present invention are desiccants which can be regenerated by desorbing the moisture adsorbed into the desiccant upon exposing the desiccant to a stream of dry gas. Useful regenerable desiccants may be selected from the group consisting of silica gel, activated alumina, activated carbon, zeolites such as type A and X, and the like, and mixtures thereof. In a preferred embodiment, the regenerable desiccant is activated alumina. In another preferred embodiment, the particle size of the regenerable desiccant is from about 2 mm to about 6 mm, and more preferably, from about 3 mm to about 5 mm.

The oil adsorbents useful in the present invention are adsorbents which will adsorb oils, oil additives, and oil vapor fragments generated during compression, normally associated with oil lubricated compressors, especially oil-flooded screw compressors, used to supply pressurized feed gas to a membrane separation system and other types of pressurized feed gas applications. Useful oil adsorbents in the present invention may be selected from the group consisting of activated carbon, silicalite, zeolites of type A and X, silica gel, and the like, and mixtures thereof. Representative examples of commercially available activated carbon oil adsorbent materials include Calgon PCB Carbon, BPL vapor phase carbon, Carbon 207C of Sutcliffe-Speakman, Inc., Westvaco Nuchar WV-3, and Norit RB3 of American Norit. In a preferred embodiment, the oil adsorbent is activated carbon. In another preferred embodiment, the particle size of the oil adsorbent is from about 3 mesh to about 14 mesh, and more preferably, from about 4 mesh to about 8 mesh. Small size oil adsorbent particles are preferred in order to reduce the resistance to mass transfer and to ensure that the bulk of the high surface area adsorbent is accessible to the hydrocarbon molecules to be removed from the feed gas.

The purification vessel containing the first desiccant adsorption layer, second oil adsorption layer, and third desiccant adsorption layer is placed between the feed air compressor and the downstream system such as a permeable membrane system or a purified product reservoir. In general, the feed gas, passed into the inlet end of the purification vessel in step (B), is compressed to a pressure from about 30 psig to about 200 psig, preferably from about 75 psig to about 150 psig, and more preferably from about 90 psig to about 135 psig.

The amount of oil vapor present in the feed gas will vary depending upon the compressor operating conditions. In general, the oil vapor in the feed gas will be present in an amount from about 0.01 ppm to about 5 ppm. The water vapor in the feed gas will be present in an amount from about 10% RH (relative humidity) to about 100% RH.

In general, the predetermined level of water vapor in the feed gas withdrawn from the first adsorption layer in step (B) is from about 2% RH (relative humidity) to about 40% RH, preferably from about 4% RH to about 30% RH, and more preferably from about 6% RH to about 20% RH. The flow of feed gas in the purification vessel may be reversed after a preset period of time. In general, this period of time corresponds to the time when the level of water vapor in the dry feed gas withdrawn from the first adsorption layer in step (F) rises up to about 10%, and preferably from about 5% to about 10%, above the predetermined level of water vapor in the feed gas. The time for reversing the flow can be a fixed time (controlled by a timer) or it can be a variable time. When the time is variable, a concentration sensing device is utilized to maintain the water vapor concentration from rising above the predetermined level.

The energy for the separation step is provided by the difference in the pressure drop between the water vapor adsorption step and the desorption step. During the adsorption step, the pressure drop is only through the single desiccant adsorption layer. During the desorption step, the pressure drop is through two adsorption layers (the oil vapor adsorption layer and the desiccant adsorption layer). Hence, the pressure drop during the desorption step is higher than the pressure drop during the adsorption step.

The feed gas purification method of the present invention employing the novel combination of three adjacent adsorption layers can be better understood by reference to the FIGURES. Although the present invention is described and illustrated in connection with preferred embodiments, applicant intends that modifications and variations may be used without departing from the spirit of the present invention. For simplicity, the present method will be described in connection with the purification and separation of air although the method may be used to purify and separate other gaseous mixtures normally separated by the membrane separation method.

Referring to FIG. 1, purification vessel 1 having an inlet end and an outlet end contains three adjacent adsorption layers, 2, 3, and 4, which comprise a first adsorption layer comprising a regenerable desiccant, 2, a second adsorption layer comprising an oil adsorbent, 3, and a third adsorption layer comprising a regenerable desiccant, 4. The first adsorption layer 2 is adjacent to the inlet end of purification vessel 1 and third adsorption layer 4 is adjacent to the outlet end of purification vessel 1. Adsorption layers 2 and 4 are essentially identical to each other.

Ambient air containing oil vapor and water vapor is fed through gas feed conduit 5 to compressor 6. Compressor 6 compresses the feed air to the desired pressure level. The compressed air stream from compressor 6 is passed to aftercooler 8 via gas feed conduit 7 to cool the compressed air to close to ambient temperature. The cooled air stream is then passed to coalescing filter 10 via gas feed conduit 9 to remove entrained water droplets. The air stream exiting coalescing filter 10 is then introduced into the inlet end of purification vessel 1 via gas feed conduits 11 and 12, open switching valve 13, and gas feed conduit 14.

Feed air is then passed into the inlet end of purification vessel 1 and into first adsorption layer 2 to remove water vapor from the feed gas to obtain a dry feed gas having water vapor below a predetermined level. The dry feed gas is withdrawn from first adsorption layer 2 and passed into second adsorption layer 3 to remove oil vapor from the feed gas to obtain a purified, dry, oil-free gas. Adsorption layer 3 has a high oil vapor removing capacity under these conditions because water vapor from the feed gas has been removed by first adsorption layer 2. The dry, oil-free gas is withdrawn from second adsorption layer 3 and is passed into third adsorption layer 4 where the dry, oil-free gas desorbs water vapor from third adsorption layer 4 to regenerate third adsorption layer 4. The purified, oil-free gas is withdrawn from the outlet end of purification vessel 1 and third adsorption layer 4 and is passed to a downstream system via gas feed conduits 15 and 16, open switching valve 17, and gas feed conduits 18 and 19.

The downstream system, to which the purified oil-free gas from the third adsorption layer is passed, may be any system wherein an oil-free gaseous stream is desirable. Preferably, the downstream system is a permeable membrane separation system or a product reservoir, and preferably is a permeable membrane separation system.

After a preset period of time, the flow of feed gas in purification vessel 1 is reversed. Switching valves 13 and 17 are closed and switching valves 21 and 23 are opened. Feed gas is then passed into the outlet end of the purification vessel 1 and into the previously regenerated third adsorption layer 4 to remove water vapor from the feed gas via gas feed conduits 11 and 120, open switching valve 121, and gas feed conduit 15. The dry feed gas is withdrawn from the third adsorption layer 4 and passed into second adsorption layer 3 to remove oil vapor. The purified, dry, oil-free gas is withdrawn from second adsorption layer 3 and is passed into first adsorption layer 2 where the dry, oil-free gas desorbs water from first adsorption layer 2 to regenerate first adsorption layer 2. The purified, oil-free gas is withdrawn from the inlet end of purification vessel 1 and first adsorption layer 2 and is passed to a downstream lo system via gas feed conduits 14 and 122, open switching valve 123, and gas feed conduits 18 and 19.

The above steps are repeated in a continuous cyclical process until second adsorption layer 3 is saturated with oil vapor. The process is continued cyclically by switching flow directions treating the first adsorption layer like the third adsorption layer and the third adsorption layer like the first adsorption layer. Adsorption layers 2 and 4 in this process operate in a regenerative mode while adsorption layer 3 operates in a non-regenerative mode. In general, the time to complete the half cycle (switching time or breakthrough point) is from about 1 minute to about 60 minutes, preferably from about 3 minutes to about 10 minutes. Depending upon the oil vapor concentration in the feed gas, adsorption layer 2 needs to be replaced every three to six months.

From purification vessel 1, the purified feed gas, free of oil vapors is passed into gas feed conduit 19 and then to a downstream system such as a permeable membrane separation system for the separation of the purified gaseous mixture into a more permeable gas component and a less permeable gas component.

The apparatus shown in FIG. 1 employs four two-way switching valves. Using three-way switching valves would reduce the number of switching valves needed to two and using a four-way switching valve would reduce the number of switching valves to one.

Figure 2:
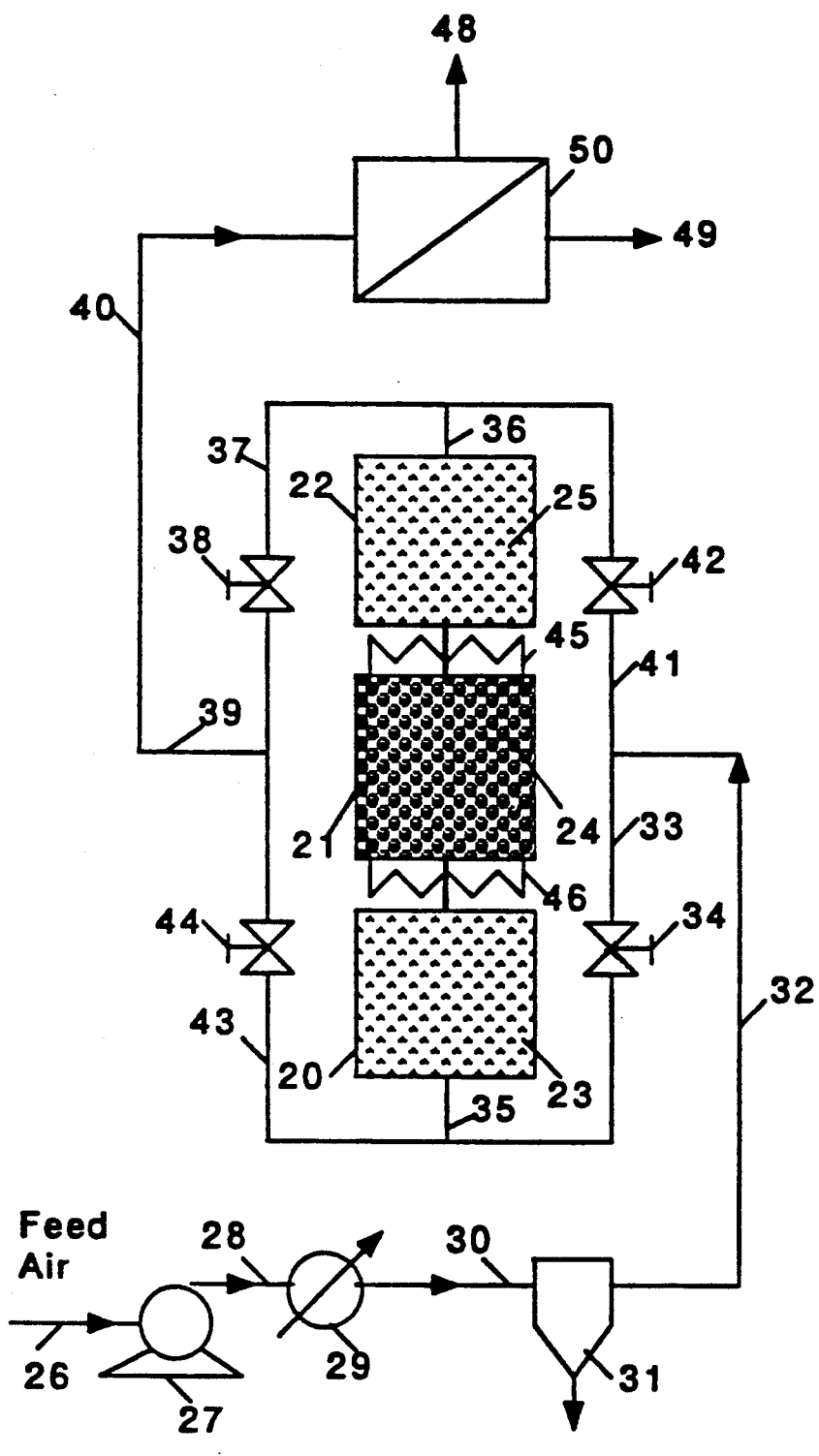
FIG. 2 is a schematic drawing of an apparatus containing three adjacent purification vessels, each vessel containing an adsorption layer, suitable for removing oil vapor from a feed gas containing water vapor according to the method of the present invention.

The apparatus shown in FIG. 1 contains three adjacent adsorption layers housed in a single purification vessel. In an alternative embodiment, each adsorption layer may be housed in a separate purification vessel such that the apparatus includes three adjacent purification vessels, each vessel housing an adsorption layer as shown in FIG. 2. In FIG. 2, purification vessel 20 contains the first adsorption layer 23 comprising a regenerable desiccant, purification vessel 21 contains the second adsorption layer 24 comprising an oil adsorbent, and purification vessel 22 contains the third adsorption layer 25 comprising a regenerable desiccant. The outlet end of first purification vessel 20 is connected to the inlet end of second purification vessel 21 and the outlet end of second purification vessel 21 is connected to the inlet end of third purification vessel 22. Adsorption layer 23 and 25 are essentially identical to each other.

Referring to FIG. 2, ambient air containing oil vapor and water vapor is fed through gas feed conduit 26 to compressor 27. Compressor 27 compresses the feed air to the desired pressure. The compressed gas from compressor 27 is passed to aftercooler 29 via gas feed conduit 28 to cool the compressed air to close to ambient temperature. The cooled air stream is then passed to coalescing filter 31 via gas feed conduit 30 to remove entrained water droplets. The air stream exiting coalescing filter 31 is then introduced into the inlet end of purification vessel 20 containing first adsorption layer 23 via gas feed conduits 32 and 33, open switching valve 34, and gas feed conduit 35.

Feed air is passed into the inlet end of purification vessel 20 and into first adsorption layer 23 to remove water vapor from the feed gas to obtain a dry feed gas having water vapor below a predetermined level. The dry feed gas is withdrawn from the outlet end of purification vessel 20 and first adsorption layer 23 and passed into the inlet end of purification vessel 21 and second adsorption layer 24 to remove oil vapor from the feed gas to obtain a purified, dry, oil-free gas. The dry, oil-free gas is withdrawn from the outlet end of purification vessel 21 and second adsorption layer 24 and is passed into the inlet end of third purification vessel 22 and third adsorption layer 25 where the dry, oil-free gas desorbs water vapor from third adsorption layer 25 to regenerate third adsorption layer 25. The purified, oil-free gas is withdrawn from the outlet end of purification vessel 22 and third adsorption layer 25 and is passed to a downstream system via gas feed conduits 36 and 37, open switching valve 38, and gas feed conduits 39 and 40.

After a preset period of time, the flow of feed gas in the three adjacent purification vessels, 20, 21, and 22 is reversed. Switching valves 34 and 38 are closed and switching valves 42 and 44 are opened. Feed gas is then passed into the outlet end of purification vessel 22 and into previously regenerated third adsorption layer 25 to remove water vapor from the feed gas via gas feed conduits 32 and 41, open switching valve 42, and gas feed conduit 36. The dry feed gas is withdrawn from the inlet end of purification vessel 22 and the third adsorption layer 25 and passed into the outlet end of purification vessel 21 and the second adsorption layer 24 to remove oil vapor. The purified, dry, oil-free gas is withdrawn from the outlet end of purification vessel 21 and the second adsorption layer 24 and is passed into the outlet end of purification vessel 20 and first adsorption layer 23 where the dry, oil-free gas desorbs water from first adsorption layer 23 to regenerate first adsorption layer 23. The purified, oil-free gas is withdrawn from the inlet end of purification vessel 20 and first adsorption layer 23 and is passed to a downstream system via gas feed conduits 35 and 43, open switching valve 44, and gas feed conduits 39 and 40.

The above steps are repeated in a continuous cyclical process by switching flow directions until second adsorption layer 24 is saturated with oil vapor. The process is continued cyclically by switching flow directions treating the first purification vessel like the third purification vessel and the third purification vessel like the first purification vessel. Purification vessels 20 and 22 in this process operate in a regenerative mode while purification vessel 21 operates in a non-regenerative mode.

FIG. 2 also shows optional heaters 45 and 46 which can aid in the further regeneration of adsorption layers 25 and 23, respectively. Heater 45 is switched on to heat the dry, oil-free gas exiting second adsorption layer 24 and entering third adsorption layer 25. The heated gas desorbs additional water from third adsorption layer 25. After heating the gas exiting layer 21 for a certain amount of time, the heater 45 will normally be turned off with continued flow of gas into layer 25 for an additional amount of time to cool adsorption layer 25 before switching the flow direction. Heater 46 is switched on to heat the dry, oil-free gas exiting second adsorption layer 24 and entering first adsorption layer 23. The heated gas desorbs additional water from first adsorption layer 23. Again, heater 46 is turned off after a certain amount of time and the flow of gas continued for an additional amount of time to cool the adsorption layer 23.

FIG. 2 also shows separation of the oil-free gas in a permeable membrane separation system. The oil-free gaseous feed mixture is passed to membrane separator 50 via gas feed conduit 40 where the mixture is separated. The residue stream, enriched in the less permeable component, is passed to gas feed conduit 48 and the permeate stream, enriched in the more permeable component, is passed to gas feed conduit 49.

While FIG. 2 shows purification vessels 20, 21, and 22 in a vertical position, the purification vessels may also be employed in other configurations such as a horizontal position or connected in a side-by-side mode.

Figure 3:
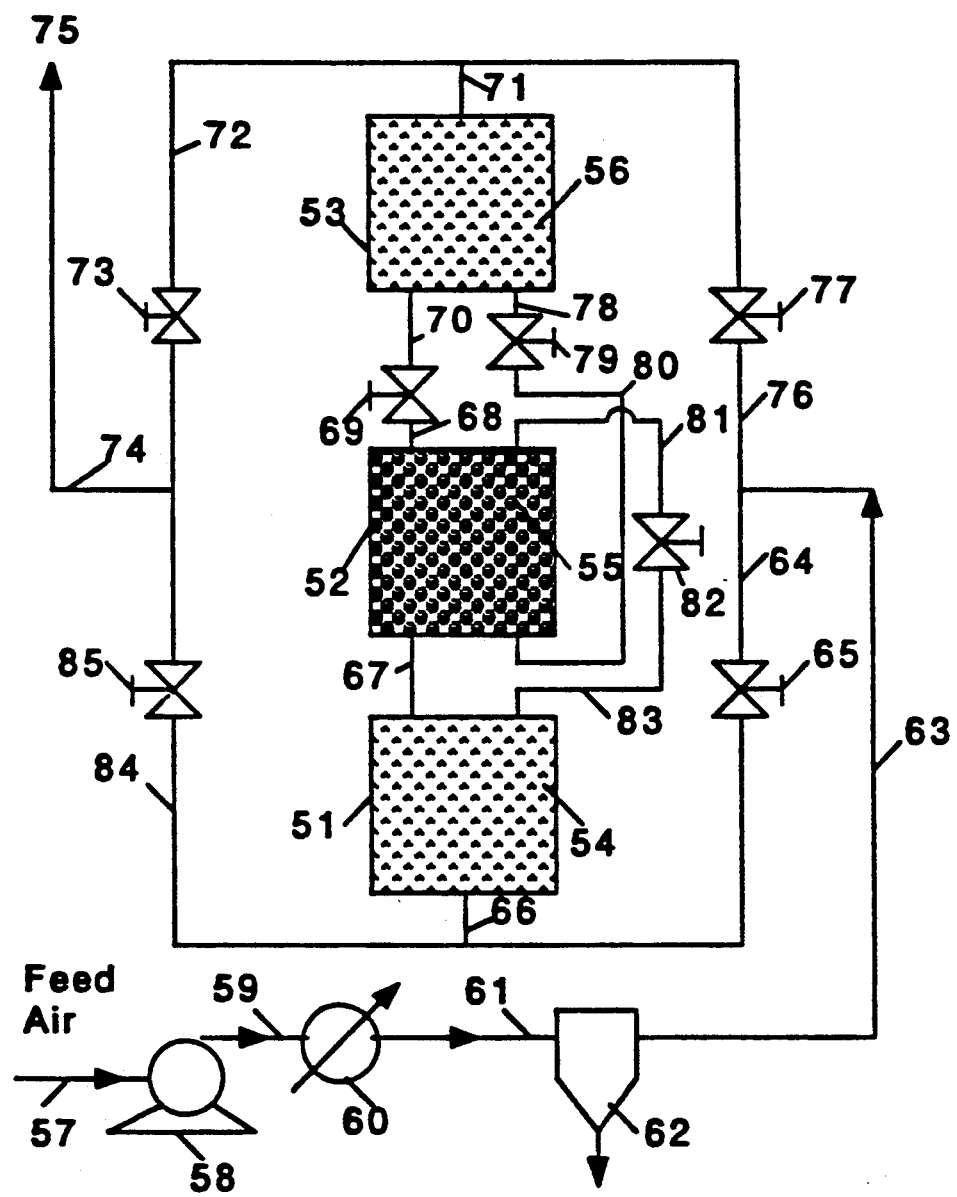
FIG. 3 is a schematic drawing of an apparatus containing three adjacent purification vessels, with the middle vessel having unidirectional flow, each vessel containing an adsorption layer, suitable for removing oil vapor from a feed gas containing water vapor according to the method of the present invention.

In FIGS. 1 and 2, the oil-vapor fronts in the second adsorption layer move from the ends of the adsorption layer to the center of the adsorption layer. FIG. 3 shows an arrangement with the middle vessel having unidirectional flow such that the flow direction in the second adsorption layer is the same regardless of the flow direction in the first and the third adsorption layers. The movement of the oil-adsorbent front in FIG. 3 is from the inlet end of purification vessel 52 (adjacent to the outlet end of purification vessel 51) to the outlet end of purification vessel 52 (adjacent to the inlet end of purification vessel 53) and may lead to more effective utilization of the oil adsorption layer 55.

In FIG. 3, purification vessel 51 contains first adsorption layer 54 comprising a regenerable desiccant, purification vessel 52 contains second adsorption layer 55 comprising an oil adsorbent, and purification vessel 53 contains third adsorption layer 56 comprising a regenerable desiccant. The outlet end of first purification vessel 51 is connected to the inlet end of second purification vessel 52 and the outlet end of second purification vessel 52 is connected to the inlet end of third purification vessel 53. Also, the outlet end of third purification vessel 53 is connected to the inlet end of second purification vessel 52 and the outlet end of second purification vessel 52 is connected to the outlet end of first purification vessel 51. Adsorption layers 5 and 56 in purification vessels 51 and 53, respectively, are essentially identical to each other.

Referring to FIG. 3, ambient air containing oil vapor and water vapor is fed through gas feed conduit 57 to compressor 58. Compressor 58 compresses the feed air to the desired pressure level. The compressed air stream from compressor 58 is passed to aftercooler 60 via gas feed conduit 59 to cool the compressed air to close to ambient temperature. The cooled air stream is then passed to coalescing filter 62 via gas feed conduit 61 to remove entrained water droplets. The air stream exiting coalescing filter 62 is then introduced into the inlet end of purification vessel 51 containing first adsorption layer 54 via gas feed conduits 63 and 64, open switching valve 65, and gas feed conduit 66.

Feed air is passed into the inlet end of purification vessel 51 and into first adsorption layer 54 to remove water vapor from the feed gas to obtain a dry feed gas having water vapor below a predetermined level. The dry feed gas exiting vessel 51 is withdrawn from first adsorption layer 54 and passed into the inlet end of purification vessel 52 and second adsorption layer 55 via gas feed conduit 67 to remove oil vapor from the feed gas to obtain a purified, dry, oil-free gas. The dry, oil-free gas is withdrawn from the outlet end of purification vessel 52 and second adsorption layer 55 and is passed into the inlet end of third purification vessel 53 and third adsorption layer 56 via gas feed conduit 68, open switching valve 69 and gas feed conduit 70 to desorb water vapor from the third adsorption layer 56 and to regenerate third adsorption layer 56. The purified, oil-free gas is withdrawn from the outlet end of purification vessel 53 and third adsorption layer 56 and is passed to a downstream system via gas feed conduits 71 and 72, open switching valve 73, and gas feed conduits 74 and 75.

After a preset period of time, the flow of feed gas in purification vessels 51 and 53 is reversed. In this embodiment, the flow of feed gas in purification vessel 52 is maintained in one direction. Switching valves 65, 69 and 73 are closed and switching valves 77, 79, 82 and 85 are opened. Feed gas is then passed into the outlet end of purification vessel 53 and into previously regenerated third adsorption layer 56 to remove water vapor via gas feed conduits 63 and 76, open switching valve 77, and gas feed conduit 71. The dry feed gas is withdrawn from the inlet end of purification vessel 53 and the third adsorption layer 56 and passed into the inlet end of purification vessel 52 and the second adsorption layer 55 to remove oil vapor via gas feed conduit 78, open switching valve 79, gas feed conduit 80. The purified, dry, oil-free, gas is withdrawn from the outlet end of purification vessel 52 and the second adsorption layer 55 and passed into purification vessel 51 and the outlet end of first adsorption layer 54 via gas feed conduit 81, open switching valve 82, and gas feed conduit 83 where the dry, oil-free gas desorbs water from first adsorption layer 54 to regenerate first adsorption layer 54. The purified, oil-free gas is withdrawn from the inlet end of purification vessel 51 and first adsorption layer 54 and is passed to a downstream system via gas feed conduits 66 and 84, open switching valve 85, and gas feed conduits 74 and 75.

In a preferred embodiment, the present invention is directed at an adsorption method for removing oil vapor from a feed gas containing water vapor which comprises the steps of:

(A) providing a purification vessel having an inlet end and an outlet end and containing three adjacent adsorption layers which comprise:

(a) a first adsorption layer comprising a regenerable desiccant;

(b) a second adsorption layer comprising an oil adsorbent;

(c) a third adsorption layer comprising a regenerable desiccant;

wherein the first adsorption layer is adjacent to the inlet end of the purification vessel and the third adsorption layer is adjacent to the outlet end of the purification vessel;

(B) passing the feed gas into the inlet end of the purification vessel and into the first adsorption layer to remove water vapor from the feed gas and to produce a dry feed gas having water vapor below a predetermined level;

(C) withdrawing the dry feed gas from the first adsorption layer and passing the dry feed gas into the second adsorption layer to remove oil vapor from the feed gas and to produce a purified, dry, oil-free gas;

(D) withdrawing the dry, oil-free gas from the second adsorption layer and passing the dry, oil-free gas into the third adsorption layer to desorb water from the third adsorption layer and thereby regenerate the third adsorption layer;

(E) withdrawing the purified oil-free gas from the third adsorption layer and the outlet end of the purification vessel and passing the purified gas to a downstream system;

(F) after a preset period of time, reversing the flow of feed gas in the purification vessel by passing the feed gas into the outlet end of the purification vessel and into the regenerated third adsorption layer to remove water vapor, into the second adsorption layer to remove oil vapor, and into the first adsorption layer to desorb water from the first adsorption layer to thereby regenerate the first adsorption layer, and withdrawing the purified oil-free gas from the first adsorption layer and the inlet end of the purification vessel and passing the purified gas to the downstream system; and (G) repeating the above steps in a continuous cyclical process.

In another embodiment, the invention is directed at an adsorption method for removing oil vapor from a feed gas containing water vapor which comprises the steps of:

(A) providing three adjacent purification vessels, each vessel having an inlet end and an outlet end, which comprise:
  (a) a first purification vessel containing a first adsorption layer comprising a regenerable desiccant;
  (b) a second purification vessel containing a second adsorption layer comprising an oil adsorbent;
  (c) a third purification vessel containing a third adsorption layer comprising a regenerable desiccant;
  wherein the outlet end of the first purification vessel is connected to the inlet end of the second purification vessel and the outlet end of the second purification vessel is connected to the inlet end of the third purification vessel;

(B) passing the feed gas into the inlet end of the first purification vessel to remove water vapor from the feed gas and to produce a dry feed gas having water vapor below a predetermined level;

(C) withdrawing the dry feed gas from the outlet end of the first purification vessel and passing the dry feed gas into the inlet end of the second purification vessel to remove oil vapor from the feed gas and to produce a purified, dry, oil-free gas;

(D) withdrawing the dry, oil-free gas from the outlet end of the second purification vessel and passing the dry, oil-free gas into the inlet end of the third purification vessel to desorb water from the third purification vessel and thereby regenerate the third purification vessel;

(E) withdrawing the purified oil-free gas from the outlet end of the third purification vessel and passing the purified gas to a downstream system;

(F) after a preset period of time, reversing the flow of feed ga in the three adjacent purification vessels by passing the feed gas into the outlet end of the regenerated third purification vessel to remove water vapor, into the outlet end or the inlet end of the second purification vessel to remove oil vapor, and into the outlet end of the first purification vessel to desorb water from the first purification vessel and thereby regenerate the first purification vessel, and withdrawing the purified oil-free gas from the inlet end of the first purification vessel and passing the purified gas to the downstream system; and (G) repeating the above steps in a continuous cyclical process.

Alternatively, the feed gas in step (F) in the above embodiment may be passed from the regenerated third purification vessel into the inlet end of the second purification vessel to remove oil vapor.

In yet another embodiment, the invention is directed at an adsorption apparatus for removing oil vapor from a feed gas containing water vapor which comprises:

(A) a purification vessel having an inlet end and an outlet end and containing three adjacent adsorption layers which comprise:
  (a) a first adsorption layer comprising a regenerable desiccant;
  (b) a second adsorption layer comprising an oil adsorbent;
  (c) a third adsorption layer comprising a regenerable desiccant;
  wherein the first adsorption layer is adjacent to the inlet end of the purification vessel and the third adsorption layer is adjacent to the outlet end of the purification vessel;

(B) a source of a feed gas containing oil vapor and water vapor connected to the inlet end of the purification vessel by a conduit containing a switching valve and to the outlet end of the purification vessel by a conduit containing a switching valve; and (C) a downstream system, for receiving oil-free feed gas, connected to the outlet end of the purification vessel by a conduit containing a switching valve and to the inlet end of the purification vessel by a conduit containing a switching valve.

In yet another embodiment, the invention is directed at an adsorption apparatus for removing oil vapor from a feed gas containing water vapor which comprises:

(A) three adjacent purification vessels, each vessel having an inlet end and an outlet end, which comprise:
  (a) a first purification vessel containing a first adsorption layer comprising a regenerable desiccant;
  (b) a second purification vessel containing a second adsorption layer comprising an oil adsorbent;
  (c) a third purification vessel containing a third adsorption layer comprising a regenerable desiccant;
  wherein the outlet end of the first purification vessel is connected to the inlet end of the second purification vessel and the outlet end of the second purification vessel is connected to the inlet end of the third purification vessel;

(B) a source of a feed gas containing oil vapor and water vapor connected to the inlet end of the first purification vessel by a conduit containing a switching valve and to the outlet end of the third purification vessel by a conduit containing a switching valve; and (C) a downstream system, for receiving oil-free feed gas, connected to the outlet end of the third purification vessel by a conduit containing a switching valve and to the inlet end of the first purification vessel by a conduit containing a switching valve.

The apparatus in the above embodiment may also comprise a first heater element between the second purification vessel and the third purification vessel and a second heater element between the second purification vessel and the first purification vessel to desorb additional water from the regenerable desiccant adsorption layers in the first and third purification vessels. The above apparatus may further comprise a switching valve between the second purification vessel and the third purification vessel to permit the flow of feed gas from the outlet end of the second purification vessel to the inlet end of the third purification vessel, a switching valve between the third purification vessel and the second purification vessel to permit the flow of feed gas from the inlet end of the third purification vessel to the inlet end of the second purification vessel, and a switching valve between the second purification vessel and the first purification vessel to permit the flow of feed gas from the outlet end of the second purification vessel to the outlet end of the first purification vessel. In this embodiment, the flow direction of feed mixture in the oil adsorption layer is maintained in one direction regardless of the flow direction in the regenerable desiccant adsorption layers to more effectively utilize the oil adsorption layer.

In accord with the present invention, a feed gas mixture containing oil vapor and water vapor may be purified prior to separating the mixture in a permeable membrane system. The membrane system may be any system capable of selectively permeating a more readily permeable component from a feed mixture. Thus, membranes of the composite type, asymmetric type, or any other membrane structure type can be protected from undue degradation by the method of the present invention. Composite membranes generally comprise a thin separation layer or coating of a suitable permeable membrane material superimposed on a porous substrate, with the separation layer determining the separation characteristics of the composite membrane structure. Asymmetric membranes generally comprise a single permeable membrane material having a thin dense semipermeable skin that determines the separation characteristics of the membrane, and a less dense, porous, nonselective support region that precludes the collapse of the thin skin region under pressure. Such membrane structures may be prepared in a variety of forms, such as spiral-wound, hollow fiber, flat sheet, and the like. Membrane structures are commonly employed on membrane assemblies that are typically positioned within enclosures to form membrane modules that comprise the principal elements of an overall membrane system. A membrane system generally comprises a number of such modules, arranged for either parallel or series operation, and constructed as hollow fiber bundles, spiral wound cartridges, pleated flat sheet membrane assemblies, or other assemblies common in the membrane industry.

Throughout this application, various publications have been referenced. The disclosures in these publications are incorporated herein by reference in order to more fully describe the state of the art.

The present invention is further illustrated by the following examples which are presented for the purpose of demonstrating, but not limiting, the method of this invention.

COMPARATIVE EXAMPLE 1

This Example illustrates the effect of water vapor on the oil vapor adsorption capacity of an activated carbon oil adsorbent.

A DelTech (New Castle, Del.) K-13 activated carbon filter cartridge contained in a filter housing was used to determine the oil vapor removal capacity for wet and dry air. The volume of the activated carbon in the cartridge was about 700 ml. The oil vapor concentration was measured using a Beckman Total Hydrocarbon Analyzer.

Water saturated feed air containing from 0.15 ppm to 0.40 ppm oil vapor (measured as $C_1$ equivalent) was passed through the filter cartridge at 25° C. and 90 psig, and at a flow rate of 13 std. cubic ft. per min. (SCFM). The standard conditions corresponded to 1.013 bar pressure and 70° F. temperature. The activated carbon layer removed most of the oil vapor initially but after three days the oil vapor removal was less than 0.02 ppm for a feed air oil vapor concentration of from 0.15 ppm to 0.40 ppm. Hence, a substantial reduction in oil vapor removal capacity was observed in the presence of water vapor in a relatively short period of time.

Relatively dry air (−40° F., dew point at 1 atm.) containing from 0.15 ppm to 0.20 ppm oil vapor was passed through an identical DelTech K-13 activated carbon filter at 25° C. and 90 psig, and at a flow rate of 13 SCFM. Even after four weeks of continued operation, the activated carbon layer was found to remove the entire amount of oil vapor contained in the feed air.

Hence, a substantial improvement in the oil vapor removal capacity was observed for the activated carbon layer when the adsorption layer was in contact with relatively dry air.

EXAMPLE 2

This Example illustrates the removal of oil vapor from a feed gas containing water vapor according to the method of the present invention.

A purification vessel having an inlet end and an outlet end and containing three adjacent adsorption layers according to the present invention was assembled. The first adsorption layer contained 820 grams of commercially available activated alumina (4.8 mm size), the second adsorption layer contained 450 grams of commercially available activated carbon (4–6 mesh size), and the third adsorption layer contained 820 grams of commercially available activated alumina (4.8 mm size). The first adsorption layer and the third adsorption layer were identical.

Water saturated feed air was compressed by an oil lubricated compressor to a pressure of 110 psig and was passed through the purification vessel containing the three adjacent adsorption layers at a temperature of 25° C. and at a flow rate of 17.5 (standard cubic feet per minute, SCFM). A switching time of three minutes was employed. The purification vessel unit was operated for about six weeks and the dew point of the feed air entering the activated carbon second adsorption layer was measured continuously. The dew point of the feed air entering the activated carbon layer was about −30° C. at atmospheric pressure. Based on the saturated feed air at 25° C. entering the activated alumina adsorption layer, the relative humidity of the feed air entering the activated carbon adsorption layer was about 10%. Since essentially no water vapor is adsorbed on activated carbon at 10% relative humidity, the oil vapor removal capacity of the activated carbon second adsorption layer was expected to be very high.

Measurements of the oil vapor removed by the activated carbon second adsorption layer were made with a Beckman Total Hydrocarbon Analyzer. The activated carbon second adsorption layer was found to have removed the entire amount of oil vapor in the feed air which varied from about 0.2 ppm to about 0.6 ppm ($C_1$ equivalent) over the testing period.

Accordingly, the purification vessel having three adjacent adsorption layers according to the present invention provided oil-free feed gas economically and continuously.

The embodiments described herein are merely exemplary and those skilled in the art may make many variations and modifications without departing from the spirit and scope of the invention. All such modifications and variations are intended to be included within the scope of the invention as defined in the appended claims.

We claim:

1. A two-phase cyclic method for removing oil vapor from a water vapor- and oil vapor-containing feed gas and delivering the substantially oil vapor-free feed gas to a downstream system, the first phase comprising;

flowing the water vapor- and oil vapor-containing feed gas through a regenerated first water vapor-adsorbing bed, thereby dehumidifying the feed gas;

then flowing the dehumidified feed gas through an oil vapor-adsorbing bed which operates in a non-regenerative mode with respect to oil vapor, thereby removing substantially all of the oil vapor from the dehumidified feed gas;

then flowing the dehumidified, substantially oil vapor-free feed gas through a second water vapor-adsorbing bed which contains water vapor, thereby rehumidifying said feed gas and regenerating said second water vapor-adsorbing bed;

then flowing the rehumidified, substantially oil vapor-free feed gas from said second water vapor-adsorbing bed to said downstream system;

and the second phase comprising:

flowing the water vapor- and oil vapor-containing feed gas through said regenerated second water vapor-adsorbing bed, thereby dehumidifying the feed gas;

then flowing the dehumidified feed gas through said oil vapor-adsorbing bed, thereby removing substantially all of the oil vapor from the dehumidified feed gas;

then flowing the dehumidified, substantially oil vapor-free feed gas through said first water vapor-adsorbing bed, thereby rehumidifying said feed gas and regenerating said first water vapor-adsorbing bed;

then flowing the rehumidified, substantially oil vapor-free feed gas from said first water vapor-adsorbing bed to said downstream system;

the first phase ending and the second phase beginning when the concentration of water vapor in said first water vapor-adsorbing bed reaches a predetermined level, and the second phase ending and the first phase beginning when the concentration of water vapor in said second water vapor-adsorbing bed reaches said predetermined level, and the first and second phases being repeated to provide a substantially continuous flow of substantially oil vapor-free gas to said downstream system.

2. The method according to claim 1, wherein the adsorbent in the first and second water vapor-adsorbing beds is independently selected from the group consisting of silica gel, activated alumina, and mixtures thereof.

3. The method according to claim 1, wherein the level of water vapor in the dehumidified feed gas exiting said first and second water vapor-adsorbing beds is from about 2% to about 40% RH.

4. The method according to claim 1, wherein the duration of the first and second phases corresponds to a time when the level of water vapor in the dehumidified feed gas exiting said first and second water vapor-adsorbing beds rises to about 10% above the level of water vapor in the feed gas.

5. The method according to claim 1, wherein each phase is carried out over a period of from about 1 to about 60 minutes.

6. The method according to claim 1, wherein the substantially oil vapor-free gas exiting said first and second water vapor-adsorbing beds is passed to a permeable membrane separation unit.

7. The method according to claim 1 further comprising heating the dehumidified, substantially oil vapor-free feed gas exiting the oil vapor-adsorbing bed.

8. A method for removing oil vapor from a water vapor-containing feed gas in a system comprising three adsorbent beds, the first and third beds containing an adsorbent which preferentially adsorbs water vapor and the second bed containing an adsorbent which preferentially adsorbs oil vapor and which operates in a non-regenerative with respect to oil vapor, comprising the steps:

(A) flowing the feed gas through said first bed, thereby dehumidifying said feed gas;

then flowing the dehumidified feed gas through said second bed, thereby removing substantially all of the oil vapor from the dehumidified feed gas;

then flowing the dehumidified, substantially oil vapor-free feed gas through said third bed, thereby rehumidifying the feed gas and regenerating said third bed of adsorbent;

then flowing the rehumidified, substantially oil vapor-free feed gas from said third bed to a downstream system;

(B) flowing the feed gas through said third bed, thereby dehumidifying said feed gas;

then flowing the dehumidified feed gas through said second bed, thereby removing substantially all of the oil vapor from the dehumidified feed gas;

then flowing the dehumidified, substantially oil vapor-free feed gas through said first bed, thereby rehumidifying said feed gas and regenerating said first bed of adsorbent;

then flowing the rehumidified, substantially oil vapor-free feed gas from said first bed to said downstream system; and (C) repeating steps (A) and (B);

steps (A) and (B) being of substantially equal duration.

9. The method according to claim 8, wherein the adsorbent in the first and third beds is independently selected from the group consisting of silica gel, activated alumina, and mixtures thereof.

10. The method according to claim 8, wherein the adsorbent in the second bed is selected from the group consisting of activated carbon, silicalite, zeolites of type A and X, and mixtures thereof.

11. The method according to claim 8, wherein the substantially oil vapor-free gas exiting said first and third beds is passed to a permeable membrane separation unit.

12. The method according to claim 8, wherein the level of water vapor in the dehumidified feed gas exiting said first and third beds is about 2% RH to about 40% RH.

13. The method according to claim 8, wherein the duration of steps (A) and (B) corresponds to a time when the level of water vapor in the dehumidified feed gas exiting said first and third beds rises to about 10% above the level of water vapor in the feed gas.

14. The method according to claim 8, further comprising heating the dehumidified, substantially oil vapor-free feed gas exiting said second bed.

15. The method according to claim 1 or claim 8, wherein the feed gas is air.

16. The method according to claim 1 or claim 8, wherein the oil vapor in the feed gas is present in an amount from about 0.01 ppm to about 5 ppm.

17. The method according to claim 1 or claim 8, wherein the water vapor in the feed gas is present in an amount from about 10% RH to about 100% RH.

18. The method according to claim 1 or claim 8, wherein the adsorbent in said oil vapor-adsorbing bed is selected from the group consisting of activated carbon, silicalite, zeolites of type A and X, and mixtures thereof.

19. The method according to claim 1 or claim 8, wherein the feed gas is at a pressure of about 30 psig to about 200 psig.

20. An adsorption apparatus for removing oil vapor from a feed gas containing water vapor which comprises:

(A) a purification vessel having an inlet end and an outlet end and containing three adjacent adsorption layers which comprise:
  (a) a first adsorption layer comprising a regenerable desiccant;
  (b) a second adsorption layer comprising an oil vapor adsorbent which operates in a non-regenerative mode with respect to oil vapor;
  (c) a third adsorption layer comprising a regenerable desiccant;
wherein the first adsorption layer is adjacent to the inlet end of the purification vessel and the third adsorption layer is adjacent to the outlet end of the purification vessel;
(B) a source of a feed gas containing oil vapor and water vapor connected to the inlet end of the purification vessel by a conduit containing a switching valve and to the outlet end of the purification vessel by a conduit containing a switching valve; and
(C) a downstream system, for receiving oil-free feed gas, connected to the outlet end of the purification vessel by a conduit containing a switching valve and to the inlet end of the purification vessel by a conduit containing a switching valve.

21. An adsorption apparatus for removing oil vapor from a feed gas containing water vapor and delivering substantially oil-free gas to a downstream system which comprises:
(A) three adjacent purification vessels, each vessel having an inlet end and an outlet end, which comprise:
  (a) a first purification vessel containing a first adsorption layer comprising a regenerable desiccant;
  (b) a second purification vessel containing a second adsorption layer comprising an oil vapor adsorbent which operates in a non-regenerative mode with respect to oil vapor;
  (c) a third purification vessel containing a third adsorption layer comprising a regenerable desiccant; wherein the outlet end of the first purification vessel is connected to the inlet end of the second purification vessel and the outlet end of the second purification vessel is connected to the inlet end of the third purification vessel;
(B) a source of a feed gas containing oil vapor and water vapor connected to the inlet end of the first purification vessel by a conduit containing a switching valve and to the outlet end of the third purification vessel by a conduit containing a switching valve; and
(C) a downstream system, for receiving oil-free feed gas, connected to the outlet end of the third purification vessel by a conduit containing a switching valve and to the inlet end of the first purification vessel by a conduit containing a switching valve.

22. The apparatus according to claim 21, further comprising a first heater element between the second purification vessel and the third purification vessel and a second heater element between the second purification vessel and the first purification vessel.

23. The apparatus according to claim 21, further comprising a switching valve between the second purification vessel and the third purification vessel to permit the flow of feed gas from the outlet end of the second purification vessel to the inlet end of the third purification vessel, a switching valve between the third purification vessel and the second purification vessel to permit the flow of feed gas from the outlet end of the third purification vessel to the inlet end of the second purification vessel, and a switching valve between the second purification vessel and the first purification vessel to permit the flow of feed gas from the outlet end of the second purification vessel to the outlet end of the first purification vessel.

* * * * *